United States Patent [19]

Kobusch

[11] 4,361,943
[45] Dec. 7, 1982

[54] DEVICE FOR INSTALLING THREADED BUSHES

[75] Inventor: Klaus Kobusch, Bielefeld, Fed. Rep. of Germany

[73] Assignee: Böllhoff & Co., Bielefeld, Fed. Rep. of Germany

[21] Appl. No.: 152,591

[22] Filed: May 23, 1980

Related U.S. Application Data

[62] Division of Ser. No. 931,408, Aug. 7, 1978, abandoned.

[30] Foreign Application Priority Data

Dec. 8, 1977 [DE] Fed. Rep. of Germany ... 7725059[U]
Mar. 17, 1978 [DE] Fed. Rep. of Germany ....... 2811747

[51] Int. Cl.³ .............................................. B23P 19/04
[52] U.S. Cl. .................................................... 29/240
[58] Field of Search .................. 29/240, 240.5; 81/54, 81/57.44, 10

[56] References Cited

U.S. PATENT DOCUMENTS 2,929,134  3/1960  Mosher ................................ 29/240
3,388,621  6/1968  Neuschotz ........................... 29/240
3,390,597  7/1968  James .................................. 29/240

FOREIGN PATENT DOCUMENTS

568999   4/1945  United Kingdom .
612368   4/1948  United Kingdom .
655512   7/1951  United Kingdom .
1055982  1/1967  United Kingdom .
1290188  9/1972  United Kingdom .
1272771  5/1972  United Kingdom .
1327407  8/1973  United Kingdom .

*Primary Examiner*—James L. Jones, Jr.
*Attorney, Agent, or Firm*—Andrus, Sceales, Starke & Sawall

[57] ABSTRACT

A device for installing a threaded bush into a work piece has a housing containing a rotatable threaded rod. A pressure responsive piston in the housing axially moves the threaded rod with respect to the housing. A rotatable abutment sleeve is provided between the housing and the threaded rod. The bush is initially threaded on the rod and then screwed in the workpiece by rotation of the rod until a collar of the bush contacts the surface of the workpiece. Thereafter the rod is axially retracted to cause the abutment sleeve to deform a smooth walled portion of the bush to complete the installation.

6 Claims, 13 Drawing Figures

DEVICE FOR INSTALLING THREADED BUSHES

This is a divisional application of Ser. No. 931,408, filed Aug. 7, 1978, now abandoned.

BACKGROUND OF THE INVENTION

The invention relates to device for installing externally threaded hollow bushes having torsional locking and devices for fitting such bushes.

Such threaded bushes are known in various designs.

In the case of a threaded bush whose external thread itself cuts the corresponding internal thread in the workpiece, the torsional locking is achieved by a radial pinning. With this torsional locking, after screwing in the self-tapping threaded bush, drilling has to be carried out across the junction between the threaded bush and workpiece and a securing pin inserted in the drilled hole. Such an arrangement is very expensive. The threaded bush is expensive in itself, since not only the actual bush body has to be provided but also the securing pin.

Threaded bushes are also known having an external thread in which longitudinal grooves are provided. Wedges are driven into these longitudinal grooves which wedges project beyond the longitudinal grooves and engage in the material of the workpiece. Here also, the fitting of the bushes is very expensive and the threaded bush itself is correspondingly expensive because of its multi-component nature.

In another kind of threaded bush, a toothed securing ring (such as shown in U.S. Pat. No. 2,452,262) is pressed in over the neck of the inserted bush.

The object of the invention is to provide a one-piece threaded bush with torsional locking.

SUMMARY OF THE INVENTION

According to the invention there is provided an externally threaded hollow bush having an integrally formed, surrounding collar of non-circular peripheral shape, and an adjoining, essentially smooth-walled portion having a lower wall thickness than an externally threaded portion of the bush adjoining the smooth-walled portion, so that after screwing the threaded bush into a receiving hole of a workpiece until the collar comes to rest on the surface of the workpiece, the collar can be pressed into the surface of the workpiece by axial loading of the collar, entailing a reduction in the axial length of the smooth-walled portion.

In use, the threaded bush is screwed into a hole in the workpiece until the collar rests on the upper side of the workpiece. Subsequently, the collar is pressed into the workpiece until the upper side of the collar is flush with the surface of the workpiece. The opposing force for the compression occurring on pressing the collar into the workpiece is preferably not derived, in the case of non-self-tapping external threads, by the engagement of the external thread with the internal thread of the workpiece, but by a traction force exerted on the threaded portion of the bush, so that play in the thread engagement between workpiece and bush is taken up. The provision of a special space for compression in the relevant portion of the internal thread of the workpiece is not necessary.

Preferably, the non-circular peripheral shape of the collar is achieved in that the collar is provided with fissures extending forwards and backwards in a radial direction like, e.g. toothing, milling or the like.

Alternatively, the peripheral edge of the collar may be polygonal, for example hexagonal.

Where the application is for hydraulic purposes and with other applications where a completely tight connection is necessary between the threaded bush and the workpiece, it is practical to surround the smooth-walled portion by a sealing ring, preferably an O-ring.

The threaded bush may feature an internal thread into which, after the threaded bush has been inserted into a workpiece, another threaded member can be screwed. On the other hand, it is also possible for the threaded bush to feature a screw fitted in it coaxially, the threaded portion of which screw protrudes beyond the collar at one end of the bush.

With threaded bushes of this kind, and also with threaded bushes having an internal thread, it is extremely advantageous if the essentially smooth-walled portion is so arranged that it always deforms outwardly. Thus, in a practical embodiment of the invention, it is provided that the centre line of the wall thickness of the smooth-walled portion is domed outwards with respect to the axis of the bush as it extends axially of the bush.

By deviating the centre line of the wall thickness from a direction parallel to the bush axis, it is achieved that during the pressing of the collar into the workpiece and the consequent compression of the smooth-walled portion, the smooth-walled portion deforms away from the axis of the threaded bush so that danger of restricting the internal cross-section does not arise and, especially in the case of threaded bushes with an internal thread, screw members can be screwed into the internal thread without difficulty and threaded members which are to be screwed onto the threaded bushes with bolts can be brought into screwed engagement.

The invention more particularly provides a device with which the threaded bush can be rapidly installed in a simple manner.

Accordingly, the invention provides a device, for the fitting of threaded bushes, comprising a housing, a threaded rod rotatably located in the housing, which rod can be displaced axially by a piston which is subjected to pressure and is arranged to execute relative movement with respect to the housing. Known devices for fitting threaded bushes are not suitable for fitting the threaded bushes according to the invention as fouling of the threaded bush held by the thread against a fixed adjacent section of the housing would occur.

For this reason, according to the invention, it is provided that a rotatable abutment sleeve is provided between the housing and the threaded rod.

In the following, preferred embodiments of threaded bushes according to the invention, and a device for fitting these threaded bushes, are described in greater detail.

BRIEF DESCRIPTION OF THE DRAWINGS

FIG. 9 is a longitudinal section through a device for fitting threaded bushes of the kinds shown in FIGS. 1 to 6, FIG. 9a is a side view of the front end of the device of FIG. 9 with the threaded bush pressed in.

DESCRIPTION OF THE PREFERRED EMBODIMENTS

Figure 1:
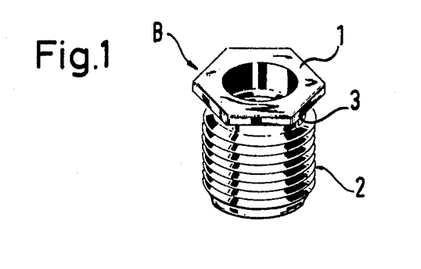
FIG. 1 is a perspective view of a first embodiment of threaded bush having a straight cylindrical smooth-walled portion.
Figure 2:
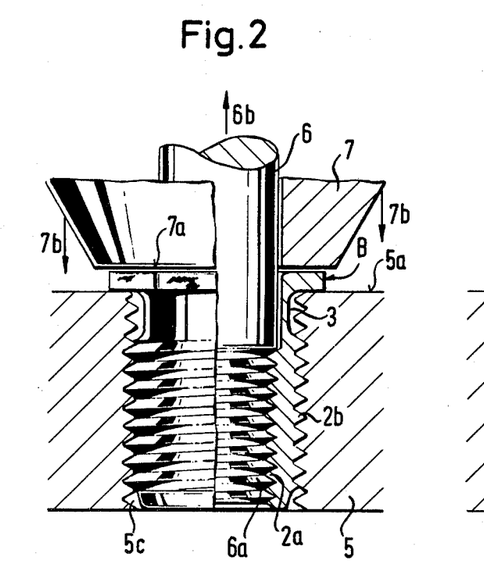
FIG. 2 shows the threaded bush of FIG. 1 partly in section with parts of a device for fitting the threaded bush engaging with it, also partly in section, whereby the threaded bush is screwed into a workpiece, the bush not yet being torsionally locked.
Figure 3:
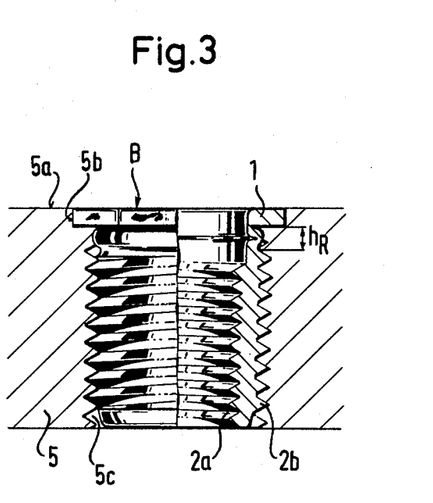
FIG. 3 shows the threaded bush of FIGS. 1 and 2 in the fitted condition.

The threaded bush B shown in FIGS. 1 to 3 consists of a collar 1 formed peripherally with six sides, a threaded portion 2 and a tube-like portion 3, essentially smooth-walled, arranged between the collar and the threaded portion and having a wall thickness less than the core cross-section of the threaded portion 2, which is provided with an internal thread 2a and an external thread 2b. As can be seen from FIG. 3, the maximum diameter of the collar 1 is so selected that it protrudes beyond the peripheral edge of a threaded hole 5c in a workpiece 5.

To insert the threaded bush B into the workpiece 5, the bush B is first screwed into the hole 5c, by means of a threaded rod 6 which features an external thread 6a on one of its ends, until the lower side of the collar 1 rests on the surface 5a of the workpiece 5 (see FIG. 2). Subsequently, an abutment 7, formed as a ring encircling the rod 6 and having a bearing surface 7a, is urged into contact with the upper side of the collar 1 so as to press the collar 1 into the workpiece. To achieve this, traction forces are applied to the threaded rod 6 in the direction of the arrow 6b and pressure forces are applied to the abutment 7 in the direction of the arrows 7b. Since the thread 6a on the rod 6 is engaged with the internal thread 2a of the threaded portion 2, as the collar 1 is pressed into the workpiece, the play between the external thread 2b and the threaded hole 5c in the workpiece is taken up.

On pressing in the collar 1, the smooth-walled portion 3 is compressed and receives the shape which can be seen in the upper right hand part of FIG. 3.

The material from which the threaded bush B is made is harder than the material of the workpiece 5; for example, the bush may be of steel and the workpiece of cast aluminium. On pressing in the collar 1, the displaced workpiece material closes tightly around the peripheral surface 5b of the collar 1, so that a practically uninterrupted transition is achieved between the peripheral surface of the collar 1 and the material of the workpiece 5.

In order to ensure deformation of the smooth-walled portion 3 in a direction outwardly away from the axis of the threaded bush B, regardless of the shape of the threaded rod 6, the distribution of wall-thickness of the smooth-walled portion 3, in the axial direction of the threaded bush, can be so selected that the centre line $M_3$ of the portion 3 (see FIG. 3a) is domed outwards with respect to the axis of the threaded bush.

Figure 3A:
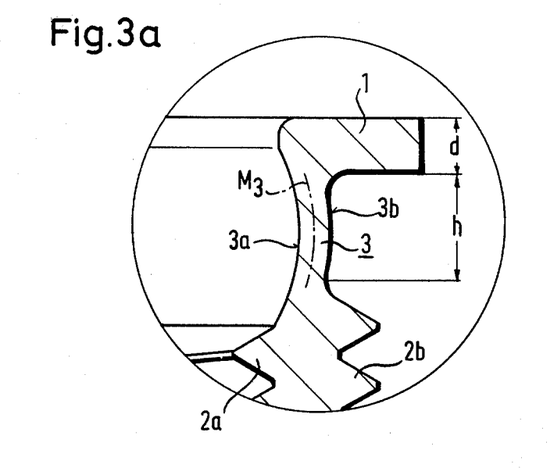
FIG. 3a is an enlarged view of an embodiment, similar to the embodiment of FIG. 1, in which the smooth-walled portion has the internal and external surfaces thereof domed outwards.

An embodiment of the threaded bush is shown in FIG. 3a in which the internal surface 3a as well as the external surface 3b of the portion 3 are domed outwards.

Figure 3B:
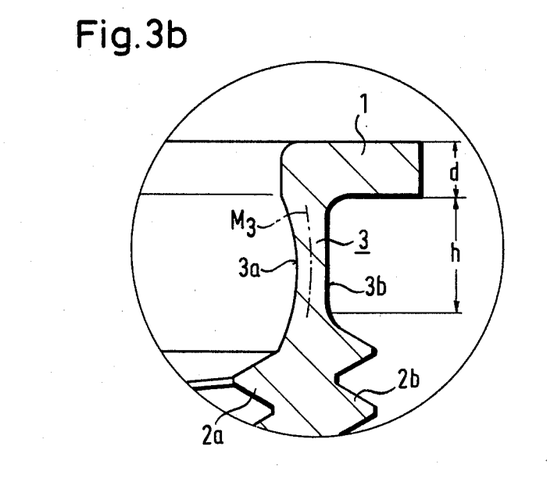
FIG. 3b is a similar view to FIG. 3a in which the internal surface of the smooth-walled portion is domed outwards and the external surface is cylindrical and parallel to the axis of the threaded bush.

In the alternative embodiment according to FIG. 3b, the internal surface 3a is domed outwards, whilst the outer surface 3b is a cylindrical surface parallel to the axis of the threaded bush B.

In both embodiments, the centre line $M_3$ of the wall is domed outwards with respect to the axis of the threaded bush. The centre line need not necessarily exhibit a constant curvature, such as for example a catenary, but can also follow a polygonal course. In FIGS. 3a and 3b, the height of the smooth-walled portion 3 is indicated by h and the thickness of the collar 1 by d. On deformation, the height h is reduced by the thickness d. The height h must be at least equal to the thickness d plus the required remaining height of deformation $h_R$, as shown for example in FIG. 3. This remaining height of deformation $h_R$ is determined by the wall thickness of the smooth-walled portion and by the extent of the desired and permissible deformation.

Figure 4:
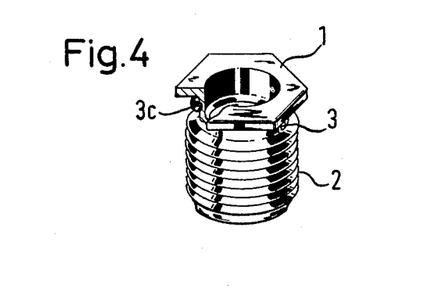
FIG. 4 shows, partly in section, the threaded bush of FIGS. 1 to 3, with a sealing ring pushed over the smooth-walled portion.
Figures 5, 6:
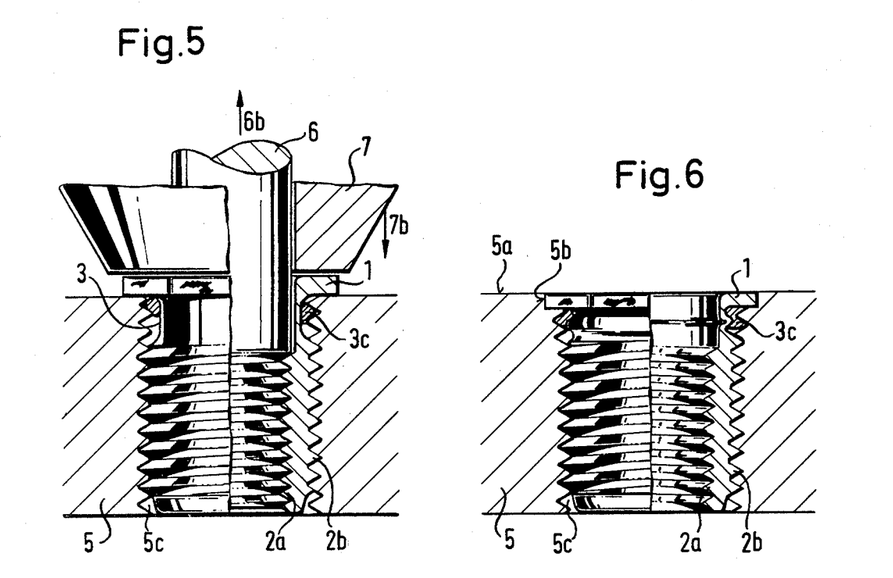
FIGS. 5 and 6 are views, similar to FIGS. 2 and 3, of the embodiment of FIG. 4.

In the embodiment according to FIGS. 4 to 6, the smooth-walled portion 3 is surrounded by a sealing O-ring 3c, which, in the installed condition of the threaded bush, lies between the internal thread of the threaded hole 5c and the compressed smooth-walled portion 3 and is correspondingly deformed. For installation purposes, the tools which are employed for installing the threaded bush according to FIGS. 1 to 3 can also be used.

Figure 7:
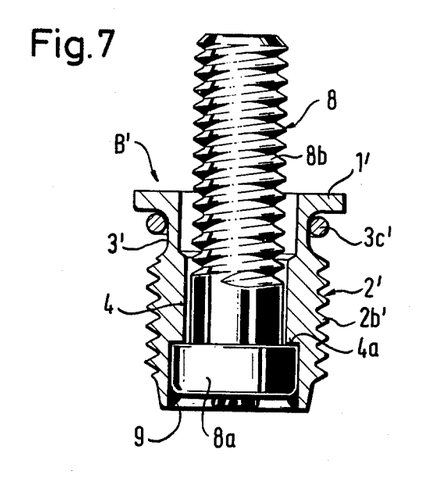
FIG. 7 shows a third embodiment of threaded bush with a threaded bolt arranged coaxially in the bush, without screw engagement with the body of the threaded bush.

In the embodiment according to FIG. 7, the internal thread in the threaded portion 2' has been replaced by a smooth-walled stepped hole 4, the widened section of the hole being at the opposite end to the collar 1'. A threaded bolt 8 with a head 8a is passed into the threaded bush B' from the end having the widened section, the threaded shaft 8b of the bolt protruding beyond the upper side of the collar 1'. The head 8a of the bolt rests on the step 4a of the stepped hole 4 and is spot welded to the threaded portion 2', as shown at 9 in FIG. 7.

Figure 8:
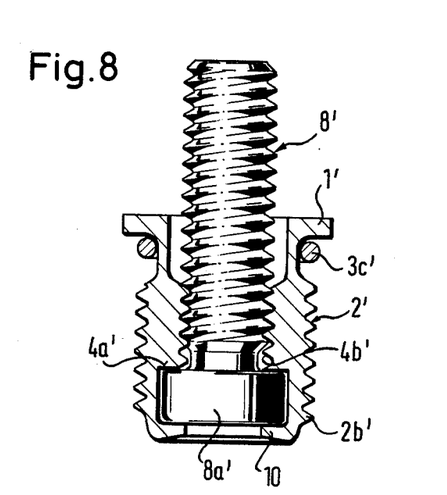
FIG. 8 shows a fourth embodiment of threaded bush with a threaded bolt in screw engagement with the body of the threaded bush.

The embodiment according to FIG. 8 differs from that of FIG. 7 in that the stepped hole 4' is provided with a thread 4b' in its smaller diameter section, which thread cooperates with the external thread of a correspondingly formed screw 8' having a head 8a'. The screw 8' is screwed into the threaded bush from the end having the wider diameter section until the head 8a' rests on the step 4a'. The axial length of the wider diameter section of the stepped hole 4' is sufficiently large so that the free rim of the stepped hole can still be turned over to form a lip 10, which firmly retains the screw against rotation in the bush.

In FIGS. 7 and 8, a sealing ring 3c' is also shown, although this is not absolutely necessary.

In order to install the threaded bushes according to FIGS. 7 and 8, the leading end of the threaded rod 6 must be correspondingly modified, i.e. the rod must be shortened and the external thread 6a must be replaced by a corresponding internal thread. This is explained further below with the aid of FIG. 10.

Figures 9, 9A:
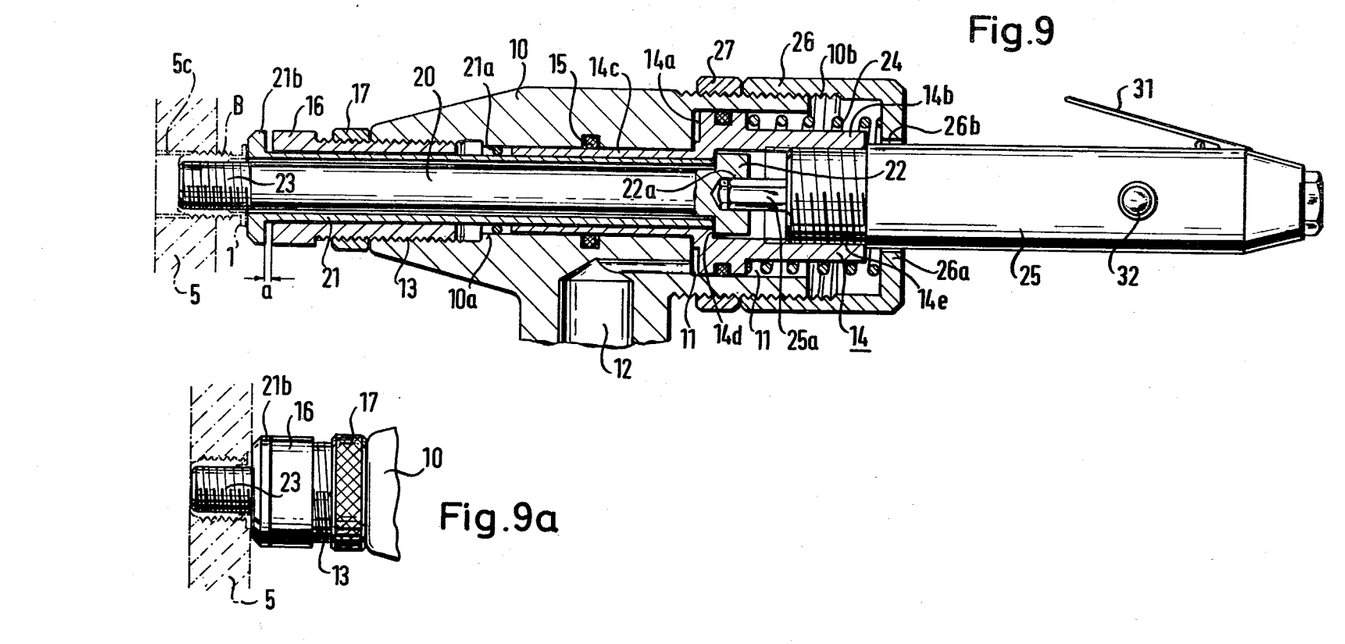

In FIGS. 9 and 9a, a device for installing the threaded bushes according to FIGS. 1 to 6 is shown.

In a housing 10 provided with a through bore 10a, a cylinder chamber 11 is formed at one end, which chamber is open at one side and, at the other side can be subjected to a pressure medium by means of a pressure feed passage 12 formed in the housing and opening into the bottom of the cylinder chamber.

The through bore 10a is provided with an internal thread 13 at the opposite end of the housing 10 to the cylinder chamber 11.

In the cylinder chamber 11 is disposed a piston 14 having an annular working surface 14a which can be subjected to pressure and which faces the bottom of the chamber 11, which surface, in the rest position of the piston 14 shown in FIG. 9, is held at a predetermined distance from the bottom surface of the cylinder chamber 11. The piston 14 consists of a hollow piston head 14b and a hollow guide extension 14c engaging in the through bore 10a. The internal diameter of the piston head 14b is larger than the internal diameter of the guide extension 14c so that a step 14d is formed between the two chambers defined within said members.

The outer diameter of the piston head 14b is stepped in the manner shown in FIG. 9. The section of the piston head 14b with the larger diameter cooperates with the wall of the cylinder chamber 11. A sealing ring 15 is located between the through bore and the outer surface of the hollow guide extension 14c, and between the wall of the cylinder chamber 11 and the increased diameter section of the piston head 14b.

A hollow mouth-piece 16 provided with an external thread is screwed into the thread 13. The internal diameter of the mouth-piece 16 corresponds to the internal diameter of the hollow guide extension 14c. The mouth-piece is releasably connected to the housing 10 by means of the screw connection to enable various threaded bushes to be installed. The mouth-piece 16 is provided with an external thread on to which a locking ring 17 is screwed so that the mouth-piece 16 can be secured to the housing by the locking ring 17 so as to be free from play and secured against rotation. A rod 20, having a threaded portion 23 at one end, extends coaxially through the mouth-piece 16 and the hollow guide extension 14c of the piston and up to the internal chamber of the piston head 14b. Between the outer surface of the rod 20 and the internal surfaces of the mouth-piece 16 and the guide extension 14c, an abutment sleeve 21 is arranged the outer surface of which contacts the inner surfaces of the mouth-piece 16 and the guide extension 14c, whilst its internal surface is spaced by a predetermined amount from the outer surface of the rod 20.

As can be seen from FIG. 9, a free space is provided in the through bore 10a between the end of the mouth-piece 16 and the end of the guide extension 14c. An O-ring or an oil seal 21a is arranged in this free space between the housing 10 and the abutment sleeve 21, and retains the sleeve 21 in the housing.

At its end protruding from the mouth-piece, the abutment sleeve is provided with a radially extending abutment flange 21b the dimensions of which correspond to those of the collar 1 of the threaded bush. As further explained below, the length of the abutment sleeve is predetermined to be greater than the distance between the end of the mouth-piece 16 protruding from the housing 10 and the step 14d of the piston in its rest position.

The threaded rod 20 is provided with a head 22 on its end which protrudes into the interior of the piston head 14b, the radial dimensions of which head 22 are so selected that it can come into contact with the step 14d of the piston and against the end surface of the abutment sleeve 21.

The piston head 14b of the piston 14 protrudes in an axial direction out of the cylinder chamber 11 and is provided with an internal thread 14e at its end remote from the guide extension 14c. A compression spring 24 is arranged around the smaller diameter section of the piston head 14b and engages the step between the smaller diameter section and the larger diameter section of the piston head 14b.

The housing of a drive motor 25 is screwed into the thread 14e. In the head 22, there is formed a hexagon-shaped recess 22a into which a hexagon-shaped drive element 25a of the drive motor 25 engages.

At the end of the housing 10 containing the cylinder chamber 11, the housing is provided with an external thread 10b on to which a closure cap 26 provided with an internal thread is screwed. The cap 26 is provided in the bottom 26a thereof with an opening 26b through which the casing of the drive motor 25 protrudes. For locating the closure cap 26 on the housing 10, a lock nut 27 is arranged on the thread 10b. The other end of the pressure spring 24 engages the bottom 26a of the closure cap and presses the piston into contact with the bottom of the cylinder chamber 11. The length of stroke of the piston 24 is determined by adjustment of the closure cap 26 on the thread 10b.

On the drive motor a switch lever 31 is provided with which the motor can be switched on and off, whilst with the help of a change-over button 32 the rotational direction of the drive element 25a can be determined. It is possible that also, together with the switch function of the switch lever, a speed regulating function can be assigned to it, depending on the degree of depression of the lever.

The device shown in FIG. 9 operates as follows. When it is wished to install a threaded bush B into a workpiece 5, the threaded bush B is first threaded onto the threaded section 23 of the rod 20 one or two turns by hand, so that the threaded bush B is held for a short time on the threaded section 23 of the rotating rod 20, with the motor turning clockwise. Whereupon, the bush B is placed on the threaded hole 5c of the workpiece 5 and the threaded bush rotating with the rod 20 is screwed into the threaded hole 5c. During this process, the threaded bush is first screwed on to the threaded section 23 of the rod 20 until the collar 1 contacts the abutment 21b of the abutment sleeve 21 and, on further rotational movement, the bush B is screwed into the threaded hole 5c. Since the abutment sleeve 21 can rotate with the rod 20, locking of the threaded bush B with the mouth-piece 16 fixed to the housing is prevented. The length of the abutment sleeve 21, already emphasised above, which provides axial spacing a between the abutment flange 21b and the end surface of the mouth-piece 16, is thus especially important. It is also possible to arrange a thrust bearing between the abutment 21b and the opposing end face of the mouth-piece 16, in order to permit the rotation of the abutment sleeve 21 with respect to the mouth-piece and thus with respect to the housing 10.

When the threaded bush has been screwed in until the collar 1 contacts the surface of the workpiece 5, the drive motor 25 is switched off and the pressure feed 12 is connected to a source of pressure medium by means of a valve which is not shown, so that the working surface 14a of the piston head 14 is subjected to pressure. Since the threaded section 23 of the rod 20 is screwed into the internal threading 2a of the bush, and the bush is held in the workpiece, relative movement takes place between the piston 14, engaging the head 22 of the threaded rod 20 by way of the step 14d, and the housing 10 and the mouth-piece 16. During this movement, the surface of the mouth-piece 16 facing the abutment flange 21b comes into engagement with the abutment flange so that a transference of force occurs from the collar 1 of the threaded bush B by way of the abutment flange 21b directly onto the mouth-piece 16 and thus the housing 10, without the cylindrical hollow portion of the abutment sleeve 21 being subjected to load. In this manner it is ensured that the abutment sleeve 21, especially in the area of the through bore 10a between the facing ends of the mouth-piece 16 and the guide extension 14c of the piston, cannot deform thus possibly also destroying the O-ring 21a. The supply of pressure by way of the pressure line is maintained until the insertion and pressing-in process of the collar 1 of the threaded bush B is completed and its upper side is flush with the surface of the workpiece 5. The final position of the tool and the deformed bush B are shown in FIG. 9a.

After pressing-in the collar 1, the drive motor 25 is rotated anticlockwise by corresponding actuation of the lever 31 and the change-over button 32, and the threaded portion 23 of the rod 20 is unscrewed from the internal thread 2a of the threaded bush B. The piston 14 and the motor carried by it are moved back by the pressure spring 24 into the position relative to the housing 10 shown in FIG. 9.

It should be mentioned here that the drive motor 25 may be of the kind driven by a pressure medium, pressure being fed to the motor through a pressure line which is not shown. However, it is also possible to employ an electric motor.

Figure 10:
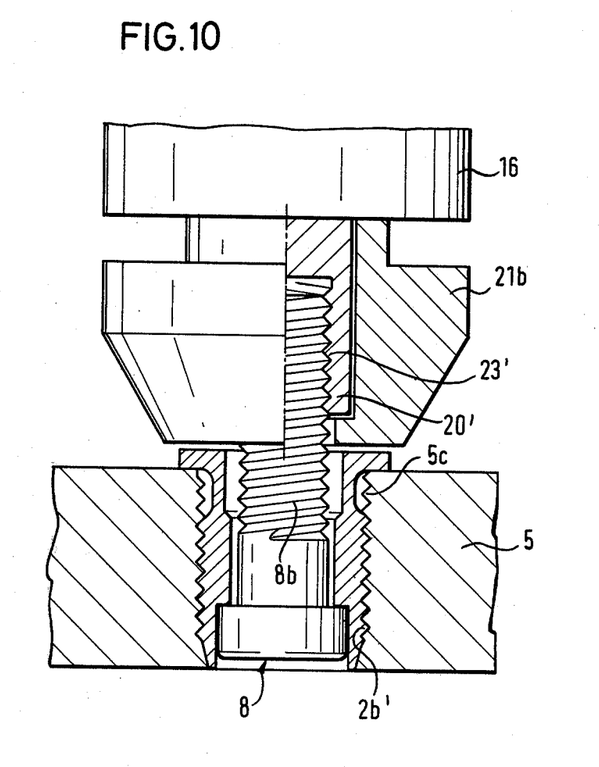
FIG. 10 is a longitudinal section through the front section of a device for fitting the threaded bushes according to FIGS. 7 and 8.

For inserting the threaded bushes according to FIGS. 7 and 8, the rod 20 of the device of FIG. 9 is replaced by a rod 20' of the kind shown in FIG. 10. The rod 20' is provided on its working end with an internal thread 23', which is screwed onto the external thread 8b of the bolt 8. If need be, also with this embodiment, by reason of the rotatability of the abutment sleeve 21 with respect to the housing 10 and the mouth-piece 16 locking of the threaded bush with the bolt to the fixed mouth-piece 16 is prevented.

The construction of the device shown enables a simple replacement of the rods 20 and 20' in which the drive motor 25 is screwed out of the piston and after removing one rod, the other rod is inserted and then the drive motor is screwed in again. Even if an exchange of rods is not intended, the embodiment of the tool shown enables an economic production of tools for the two types of threaded bushes in question.

I claim:

1. A device for rotatably inserting an axially deformable threaded bush into a workpiece, said device comprising:
   a housing;
   a rod rotatably located in said housing, said rod having means for engaging the bush to insert the bush in the workpiece by rotation of the rod;
   means coupled to said rod for rotating same;
   a fluid pressure responsive piston located in said housing and movable relative thereto, said piston being coupled to said rod for obtaining relative movement between said housing and rod; and
   abutment sleeve surrounding said rod and rotatable with respect to said housing, said sleeve having a surface abuttable with a bush engaged on said rod, said sleeve being restrained against axial movement in a first direction with respect to said rod and having a portion coacting with said housing upon the relative movement between said housing and rod for effecting axial movement between said rod and sleeve in a second direction to axially deform the bush engaged on said rod.

2. A device according to claim 1 wherein said rod extends through a bore in said housing, wherein said piston has a hollow extension extending into said bore and surrounding said rod, and wherein said abutment sleeve extends along said rod between said rod and hollow extension.

3. A device according to claim 2 wherein said rod has a shoulder and wherein said abutment sleeve extends along said rod into contact with said shoulder for restraining said sleeve against axial movement in the first direction.

4. A device according to claim 1 wherein said abutment sleeve and housing are spaced from each other by a distance providing a predetermined amount of axial movement between said rod and sleeve in the second direction responsive to the relative movement of said rod and housing.

5. A device according to claim 1 wherein said drive means has a housing fastened to said piston and a drive shaft coupled to said rod.

6. A device according to claim 5 wherein said housing has a cylindrical chamber in which said piston moves, said chamber having a closure cap through which said drive means extends, and wherein said chamber contains a spring for moving said piston opposite to the fluid pressure responsive movement.

* * * * *